No. 803,944. PATENTED NOV. 7, 1905.
T. WALLACE & F. NASH.
CONVEYING APPARATUS.
APPLICATION FILED MAY 10, 1905.

Witnesses:—
F. C. Fliedner

Inventors
Thomas Wallace
Frank Nash
By Geo. H. Strong
att

UNITED STATES PATENT OFFICE.

THOMAS WALLACE AND FRANK NASH, OF SAN FRANCISCO, CALIFORNIA.

CONVEYING APPARATUS.

No. 803,944.           Specification of Letters Patent.           Patented Nov. 7, 1905.

Application filed May 10, 1905. Serial No. 259,767.

*To all whom it may concern:*

Be it known that we, THOMAS WALLACE and FRANK NASH, citizens of the United States, residing in the city and county of San Francisco, State of California, have invented new and useful Improvements in Conveying Apparatus, of which the following is a specification.

Our invention relates to apparatus for handling soft bulky packages, such as flour, grain, baled goods, and the like.

The particular object of our invention is to provide a simple practical means for the expeditious loading of vessels with such goods as flour, grain, rice, and the like, which goods are usually put up in sacks or bags and being soft can be tumbled about more or less without injury.

Usually the loading of a vessel is a slow process and requires a large force of workmen. Where the goods have to be lowered into the hold by block and tackle, considerable time is lost in preparing and in attaching and detaching the load. Besides, only a limited number of sacks in that way can be handled at a time.

Our invention consists of the parts and the construction and combination of parts, as hereinafter more fully described and claimed, having reference to the accompanying drawings, in which—

Figure 1:
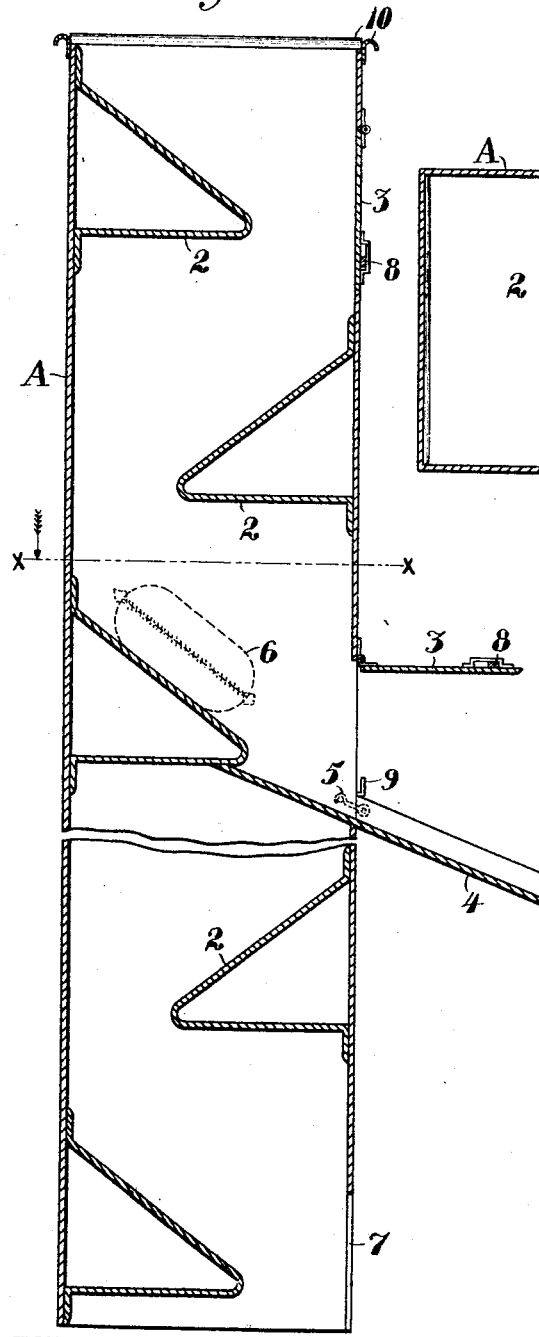
Figure 2:
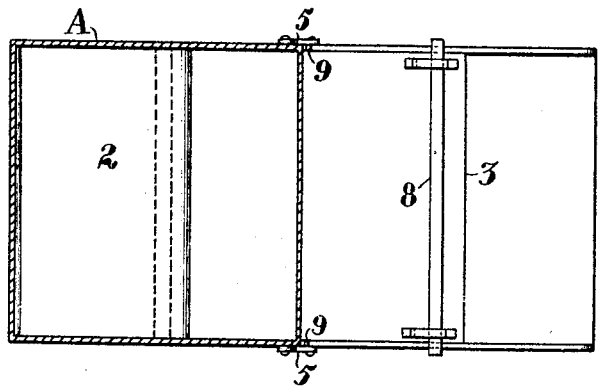
Figure 3:
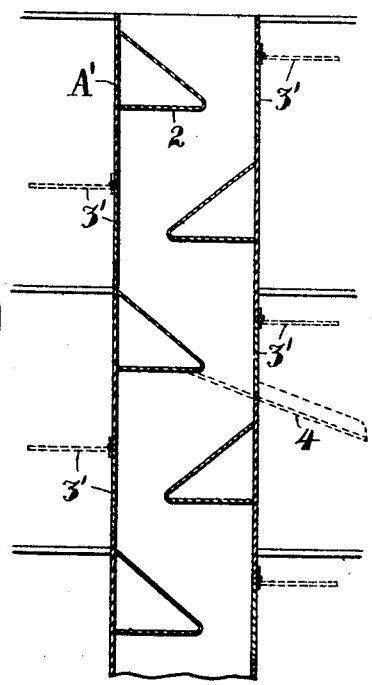

Figure 1 is a longitudinal section of our invention. Fig. 2 is a transverse section on line X X, Fig. 1. Fig. 3 is a longitudinal section of a modified form of the invention.

A represents an inclosed or tubular chute of any suitable or desired length and of such diameter as to suit it for the bulkiest packages to be handled. It may be of wood or metal and may be portable, as in Fig. 1, or it may be a fixed structure, as in Fig. 3. In the first instance it is particularly adaptable, as we have amply demonstrated in practice, for the loading of vessels between decks.

On opposite sides within the chute are a series of staggered inclined shelves or arresters 2, and opposite and a little below certain of the arresters which are on one side of the chute are arranged doors 3. These doors are hinged in any suitable manner, preferably at the top, so as to be lifted upward and outward to permit a chute conveyer or deflector, as 4, to be run into the chute A and under an arrester 2. The deflector 4 may be of any suitable length or shape. As here shown, it consists of a portion with side rails, which are cut away at the forward end of the deflector to allow the latter to be inserted in the chute A, the ends of said side rails being adapted to abut against the chute when the parts are in working position and the deflector being held in such position by suitable means, as the hooks 5.

The series of shelves or arresters 2 and doors 3 are so arranged relative to one another that a package—as, for instance, a sack of grain or the like—(indicated at 6) when dropped or thrown into the top of the chute will travel zigzag fashion down the several arresters or shelves till it comes to an open door, when it will be shunted off in the desired direction and delivered to a desired point by the deflector 4, or if all the doors are closed and barred or otherwise locked the bag will go to the bottom of the chute and discharge onto the floor or deck or onto the pile beneath through the opening 7. The doors are here shown as capable of lying in the same plane with the surrounding wall of the chute, so as to offer no sharp edges for a bag to catch or tear on when a door is closed, and the doors are shown as being held closed and rigid by the bars 8 and suitable end fastenings 9.

Where the apparatus is used for loading vessels, the chute A near the top may be provided with projections or hooks 10 or other appropriate means, whereby the chute may be hooked over or attached to the hatchcombings. The hooks 10 are so arranged that the chute can be adapted by simply turning it around to discharge fore or aft or to either side of the hatchway.

Since the chute may be adapted to extend to the bottom of the ship, it is obvious that with this apparatus we are able to load into any of the between-deck spaces. As the space between any two decks becomes filled up and if desired to shunt off the sacks or other packages onto a higher level on any one deck a corresponding door 2 is opened which is sufficiently higher up than the door previously opened to allow the deflector 4 to be positioned in the door last opened and the discharge takes place therethrough. Thus the several decks of the vessel may be loaded successively from the bottom of the hold to the upper deck without changing the apparatus further than occasionally to turn the chute to discharge in the desired direction or to open another door.

The inside dimensions of the chute A and the pitch and spacing of the shelves 2 are such that it is impossible for a package to gain any considerable momentum. The package will be shunted out onto the deflector at the same rate of speed whether the package has fallen ten feet or fifty feet. When the vessel is loaded, the deflector is withdrawn and the chute removed from the hatchway to be stowed away on the vessel or to be held in readiness for the next vessel to be loaded. This same idea of conveying goods by gravity from a higher to a lower level and distributing them to different floors is applicable in warehouses, elevators, and elsewhere. As shown in Fig. 3, the chute A' may be built as a permanent structure into a building, employing the same principle of interior zigzag shelving, with one or more doors 3' arranged between any two succeeding floors.

If desired, in this present structure there may be doors on both sides of the chute opposite to corresponding shelves, so that the discharge may take place toward either end or either side, as the case may be, of the warehouse.

It is possible that various modifications in our invention may be made without departing from the principle thereof, and we do not wish to be understood as limiting ourselves to the specific construction as herein shown and described.

Having thus described our invention, what we claim, and desire to secure by Letters Patent, is—

1. A conveying apparatus, comprising an inclosed chute provided with a series of inside oppositely-inclined arresters, said chute having side openings opposite to some of said arresters, closures for said openings and a deflector adapted to be inserted into one of said openings and to be arranged in continuation of the corresponding arrester.

2. A conveying apparatus, comprising an inclosed chute provided with oppositely-arranged inclined arresters, said chute having a feed-opening at the top and a discharge-opening at one side opposite to a corresponding arrester and a closure for said discharge-opening, said closure adapted to lie in a plane continuous with the surrounding wall of the chute, and means for locking said closure.

3. A conveying apparatus, comprising an inclosed chute, having means at its upper end for suspending it and provided with a series of inside oppositely-disposed inclined arresters, said chute having a feed-opening at the top and discharge-openings at one side opposite the corresponding arresters, hinged closures for said discharge-openings, and a deflector fitting one of said openings and arranged to be held in continuation with the corresponding arrester.

In testimony whereof we have hereunto set our hands in presence of two subscribing witnesses.

THOMAS WALLACE.
FRANK NASH.

Witnesses:
HARRY L. HORN,
JENNIE WOLFE.